Nov. 25, 1969  H. H. HOLLY  3,479,687

MOLDING APPARATUS WITH EXPANSION RELEASE

Filed March 24, 1967  2 Sheets-Sheet 1

INVENTOR
HARRY H. HOLLY
BY Hofgren, Wegner, Allen,
Stellman & McCord.
ATTORNEYS.

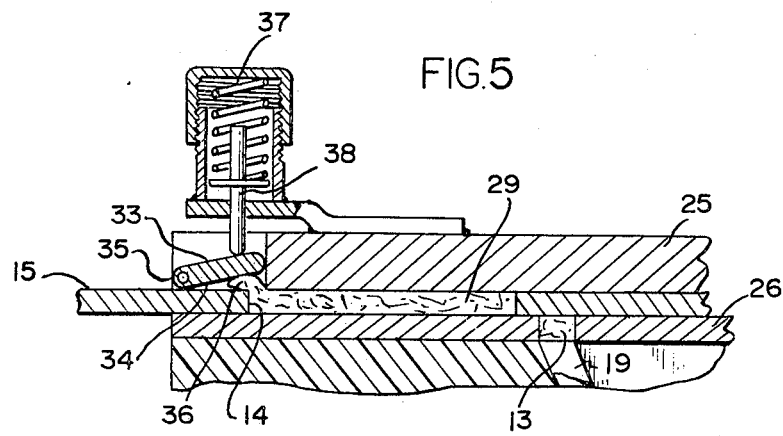
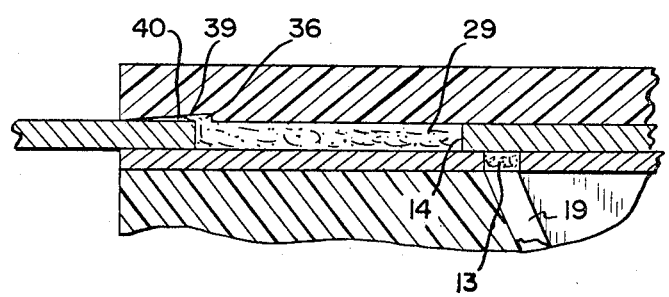
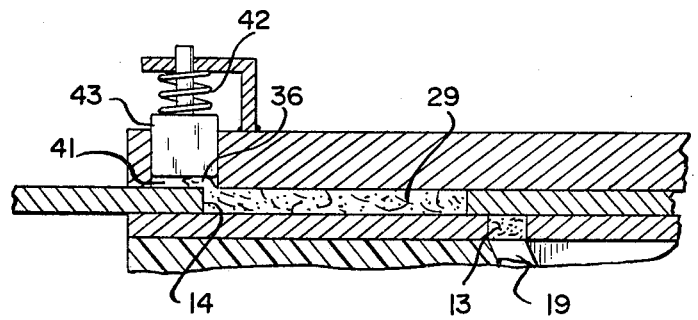
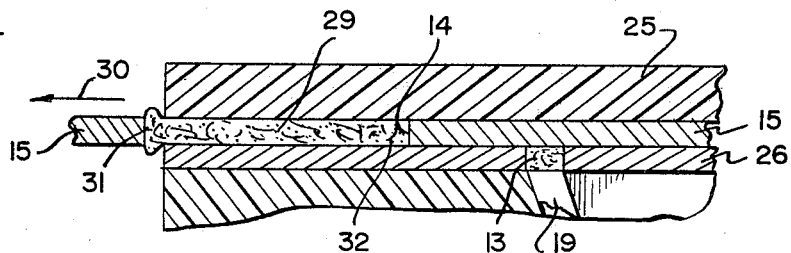

United States Patent Office 3,479,687
Patented Nov. 25, 1969

3,479,687
MOLDING APPARATUS WITH EXPANSION RELEASE
Harry H. Holly, Olympia Fields, Ill., assignor to Hollymatic Corporation, a corporation of Illinois
Filed Mar. 24, 1967, Ser. No. 625,642
Int. Cl. A22c 7/00
U.S. Cl. 17—32                                                                 8 Claims

ABSTRACT OF THE DISCLOSURE

Apparatus for molding articles of a plastic material containing entrapped gaseous fluid including means for forcing the material into a mold cavity under pressure through a feeder opening and means for releasing this pressure on the material in the mold cavity after the cavity is out of communication with the feeder opening and prior to the cavity being moved to ejecting position together with means for forcing the material back into the cavity after it had been displaced therefrom by operation of the releasing means.

CROSS REFERENCE

A molding apparatus of the same general type as disclosed herein and disclosing other elements of the apparatus in detail is disclosed and claimed in the copending U.S. Patent 3,293,688 and is assigned to the same assignee as the present application. In this prior copending patent there is disclosed a supply means for providing a supply of plastic material having an exit opening through which the material which is customarily a food material may be forced, feeder means for moving the material to and through the exit opening under pressure, a mold such as a reciprocable mold plate with a mold cavity therein communicating with the exit opening to receive the plastic material under pressure and sealing means such as upper and lower parallel plates between which the mold plate is reciprocated and closing the sides of the mold except for that portion of one side coinciding with the exit opening when the mold cavity is in filling position. The mold, specifically the mold plate, is movable from a position where the cavity receives the material through the filling opening under pressure to form the article to the shape of the cavity and a position where the cavity is out of communication with the exit opening and on its way to a place of removal of the shaped article.

In molding articles such as patties of a plastic material containing entrapped gaseous fluid such as ground meat, fish and the like such as entrapped air, it is common to force the material under pressure into a mold cavity to shape the article. Then, the mold is moved out of communication with the material as in moving to a place of ejection. This invention provides an apparatus whereby the fluid pressure within the article or patty is released by projecting a portion of the material into a release chamber means in order that the fluid under pressure will not cause an expansion disruption of the article when the pressure on the material in the mold cavity is first released.

Certain embodiments of the invention are illustrated in the accompanying drawings in which:

FIGURE 4 is an enlarged fragmentary vertical sectional view illustrating the position of the mold plate at its first emerging from between the top and bottom guide plates on its way to ejecting the formed patty.

FIGURE 5 is an enlarged fragmentary vertical sectional view through a molding apparatus embodying the invention.

FIGURE 6 is a view similar to FIGURE 5 but illustrating a second embodiment of the invention.

FIGURE 7 is a view similar to FIGURES 5 and 6 but illustrating a third embodiment of the invention.

Figure 1:
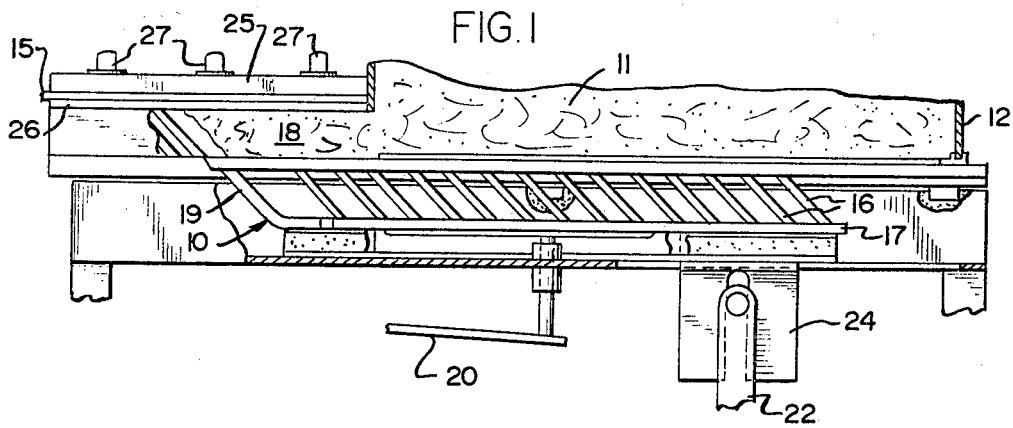
FIGURE 1 is a fragmentary side elevational view partially in section of a molding device similar to the one disclosed more fully in my above patent and without incorporating this invention.

As is explained in the above patent, feeder means 10 are employed to move the plastic material such as the ground meat 11 from a supply means such as a supply hopper 12 through an exit opening 13 leading from the supply means into a mold cavity 14 in a reciprocable mold plate 15.

Figure 2:
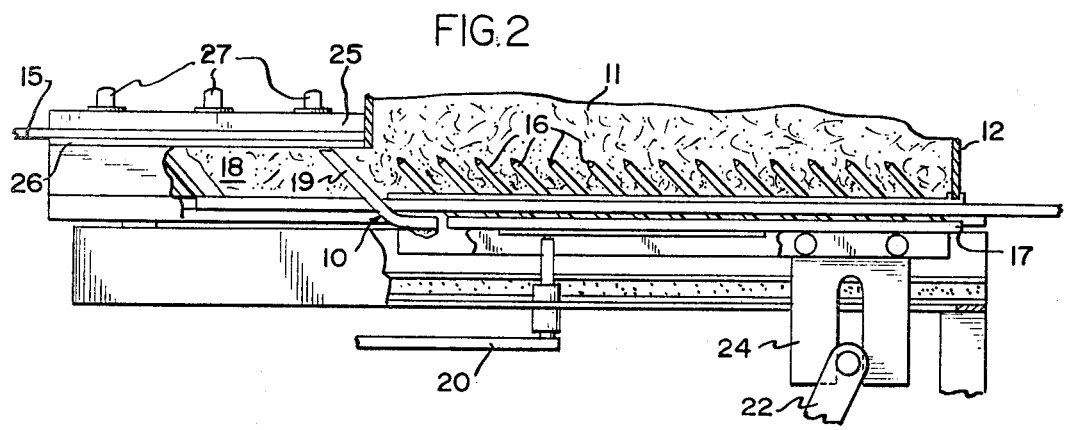
FIGURE 2 is a view similar to FIGURE 1 but showing the feeder means in position remote from the mold cavity preparatory to filling the cavity in the mold plate.

In the accompanying drawings only enough of the molding apparatus structure is shown to illustrate the invention. Thus, the feeder means 10 as is explained in detail in the above patent is essentially a four motion feeder means that comprises forwardly sloped spaced pins 16 mounted on a bottom plate 17 and sloped forwardly toward the front of the supply hopper 12 that includes the forwardly extending passage means or tunnel 18. At the front of the plate 17 forwardly of the pins 16 there is provided a forwardly sloped feeder bar 19 that extends, when in the feeding position of FIGURES 2 and 3, substantially completely across the generally rectangular cross sectioned passage means 18.

In the first of the four motions, the feeder means 10 is lowered to the position shown in FIGURE 1 where it is beneath the supply hopper 12 by lowering a lever 20 such as with a cam (not shown) operating on a cam follower 21. Then, in the second motion, the feeder means 10 is retracted to a position below the hopper 12 and below its position shown in FIGURE 2. In the third motion, it is raised to the position shown in FIGURE 2 by the lever 20 where the pins 16 and feeder bar 19 are within the bottom of the hopper 12 and the feeder bar 19 is at the rear of the passage means 18. Then, in the fourth motion, the feeder means 10 is moved forwardly by a lever 22 engaging a slot 23 in a downwardly extending drive bar 24 so that the feeder bar 19 will force the plastic material such as the ground meat forwardly in the passage means 18 and through the exit opening 13 into the mold cavity 14.

Figure 3:
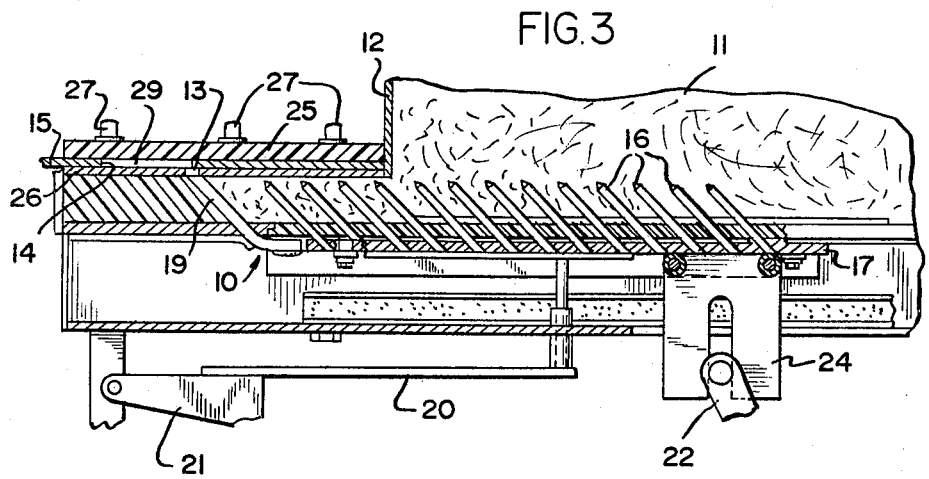
FIGURE 3 is a view similar to FIGURES 1 and 2 but showing the forward end of the apparatus in vertical section and with the feeder means at the end of its feeding movement.

As is shown most clearly in FIGURES 3 and 4 the mold plate 15 is reciprocated between pressure confining means in the form of plates 25 and 26 with these two plates held in this assembled relationship by spaced bolts 27. As is true in apparatus of this type, the reciprocating movement of the mold plate 15 is in timed relationship to the movement of the feeder means 10 so that the feeder means moves forwardly to coincide with the time the mold cavity 14 is in communiaction with the exit opening 13 from the supply means, here exemplified in the hopper 12 and passage means 18. When this occurs, the plastic material such as the meat is forced upwardly through the exit opening 13 into the mold cavity 14 to form the molded article or meat patty 29 having the shape of the mold plate cavity 14. After the cavity is filled the mold plate is moved to the left to a place of ejection of the formed patty 29.

All of the structure disclosed and described above is a part of the entire apparatus disclosed and claimed in the above mentioned prior U.S. Patent 3,293,688.

It has been found that in some instances in such an apparatus the mold plate 15 when being moved from the position shown in FIGURE 3 where the cavity 14 receives the plastic material under pressure through the filling opening 13 towards a position where the cavity is out of communication with the exit opening 13 as indicated by the arrow 30 in FIGURE 4 the internal pressure within the patty 29 caused by the entrapped fluid which is principally air between the particles of meat causes the leading edge when suddenly released from confinement between the top and bottom plates 25 and 26 to expand both upwardly and downwardly of the plate 15 to form the edge 31 thickened as shown in FIGURE 4. This not only produces an unsightly patty but also makes stacking of the patties difficult and if the stack includes very many patties the stack will actually be non-uniform as it will be thicker on the side where the leading edges are located than on the opposite side where the following edges 32 are located.

The present invention successfully solves this problem of almost explosive expansion of the leading edge portion of the molded article such as the illustrated patty when the pressure thereon is suddenly released. In the embodiment of FIGURE 5 the apparatus for accomplishing this comprises as the pressure release means a movable ram means embodied in a hinged transverse plate 33 arranged in a material receiving chamber 34. This plate is arranged transversely to the direction of movement 30 of the mold plate 15 and is slightly longer than the lateral dimension of the mold cavity 14. Thus in FIGURE 5 the mold cavity 14 is generally cylindrical and the hinged plate 33 is slightly longer than the diameter of this cylinder.

The elongated plate 33 has its leading end 35 extending in the direction 30 of outward movement of the mold plate 15. This end 35 has its bottom surface adjacent the top of the plate 15 and is inclined upwardly therefrom so as to provide a space between the transverse plate 33 and the mold plate 15 into which the material of the patty 29 may expand as illustrated in FIGURE 5 by the extruded portion 36.

In order to aid in returning this extruded portion 36 back to the mold cavity 14 as the mold plate 15 moves outwardly in the direction 30 the hinged plate 33 is urged downwardly by means of an adjustable spring 37 that bears downwardly on the inclined plate 33 through a vertically movable rod 38.

With this construction the material within the patty 29 is under heavy pressure from the feeder bar 19 when the mold cavity 14 is in communication with the filling opening 13 as shown in FIGURE 3. It has been discovered that if this pressure is not released it will have an instantaneous release with an almost explosive force when the leading edge of the mold cavity 14 first emerges from between the confining plates 25 and 26 to form the thickened leading edge 31 as shown in FIGURE 4. However, by providing the chamber 34 the pressure is released by extruding the portion 36 into this chamber before the mold cavity 14 leaves the confinement of the plates 25 and 26. Then, as the mold plate 15 moves further in the direction 30 the combination of the compression spring 37 and the inclined lower surface of the transverse plate 33 serves to smooth this extruded portion 36 back into the patty 29 at the top surface thereof. The result is that the successive patties are of substantially uniform thickness and do not have the thickened edges illustrated at 31 in FIGURE 4.

In the embodiment of FIGURE 6, and where the plastic material is sticky and adhesive such as ground meat, an inclined surface 39 alone is sufficient to force much of this extruded material 36 back into the patty. This occurs because the adhesive material 36 tends to be dragged along by the patty 29 on movement of the mold plate along its cavity 14 to the left preparatory to ejecting the patty. Thus, as is illustrated here, the inclined surface 39 forms the top wall of the expansion chamber 40.

The embodiment of FIGURE 7 is somewhat similar to that of FIGURE 5 in that there is also provided a chamber 41 into which the extruded portion 36 is received. However, in this embodiment there is no inclined surface such as is used in each of FIGURES 5 and 6 but a spring 42 of ram or plunger 43 first yields under pressure of the extruded portion 36 and then returns to force this portion back into the patty 29 as the top surface of the patty is progressively exposed to the plunger. The plunger 43 like the hinge plate 33 has a length somewhat greater than the width of the mold cavity 14.

Having described my invention as related to the embodiments shown in the accompanying drawings, it is my intention that the invention be not limited by any of the details of description, unless otherwise specified.

I claim:

1. Apparatus for molding articles of a plastic material containing entrapped gaseous fluid, comprising: supply means for providing a supply of said plastic material having an exit opening; feeder means for forcing said material under pressure through said exit opening; a mold having a mold cavity movable between a receiving position where said cavity receives said material under pressure through said opening to form said article and a position where said cavity is out of communication with said exit opening; pressure confining means between which said mold cavity and material contained therein are movable from said receiving position to maintain said material under said pressure; and pressure release means in said pressure confining means spaced from said receiving position and communicating with said mold cavity only after said cavity has thusly been moved away from said receiving position and out of communication with said exit opening for releasing internal pressure in said article within the cavity.

2. The apparatus of claim 1 wherein said mold cavity has a leading edge in the direction of said movement and the pressure release means is located ahead of said leading edge when said cavity is in material receiving position.

3. The apparatus of claim 1 wherein said pressure release means receives material in releasing said pressure and includes means for returning said material to said cavity.

4. The apparatus of claim 2 wherein said pressure release means receives material in releasing said pressure and includes means for returning said material to said cavity.

5. Apparatus for molding articles of a plastic material containing entrapped gaseous fluid, comprising: supply means for providing a supply of said plastic material having an exit opening; feeder means for forcing said material under pressure through said exit opening; a mold having a mold cavity movable between a position where said cavity receives said material under pressure through said opening to form said article and a position where said cavity is out of communication with said exit opening; and pressure release means communicating with said mold cavity after said cavity has thusly been moved out of communication with said exit opening for releasing internal pressure in said article within the cavity, said pressure release means comprising means forming a chamber into which said material expands, ram means therein and yieldable means acting on said ram means for returning said material to said cavity.

6. The apparatus of claim 5 wherein said ram means is provided with a sloped surface sloped toward the mold in the direction of said movement to aid in returning said material to said cavity.

7. The apparatus of claim 6 wherein said ram means is hingedly mounted at one end adjacent said mold with the urging means being applied at an area of the ram means spaced from said hinge.

8. The apparatus of claim 4 wherein said material comprises ground meat and said means for returning said material to said cavity comprises an inclined boundary wall at said chamber sloped to said mold in the direction of movement of the mold.

References Cited

UNITED STATES PATENTS

| | | | |
|---|---|---|---|
| 2,413,046 | 12/1946 | Holly | 17—32 |
| 3,312,998 | 4/1967 | Barnes | 17—32 |
| 3,347,176 | 10/1967 | Hall | 17—32 X |
| 3,386,129 | 6/1968 | Holly | 17—32 |

LUCIE H. LAUDENSLAGER, Primary Examiner